United States Patent Office 3,257,355
Patented June 21, 1966

3,257,355
PHOSPHORUS CONTAINING POLYMERS
Claude Thomas Bean, Jr., Niagara Falls, N.Y., assignor to Hooker Chemical Corporation, Niagara Falls, N.Y., a corporation of New York
No Drawing. Filed June 1, 1961, Ser. No. 114,016
24 Claims. (Cl. 260—47)

This invention relates to novel phosphorus-containing polymers and to a novel process for their preparation.

Polymers prepared from organophosphorus compounds and containing phosphorus in the polymer chain have been known heretofore. However, as a general rule the polymers of the prior art have been linear in nature and either relatively difficult to cross-link or incapable of being cross-linked to form a cross-linked polymer.

It has been discovered that certain polycyclic phosphorus esters may be polymerized by an Arbuzov reaction to form novel polymers containing phosphorus in the polymer chain. The resultant polymers may have a relatively high molecular weight and are either cross-linked or capable of being readily cross-linked to produce thermoset resins which are characterized by exceptionable stability and flame resistance, among other desirable properties. The polymers of the present invention may be used for numerous purposes such as vulcanizing or cross-linking agents for halogen-containing thermoplastic polymers, and in the manufacture of flame resistant coatings, laminates, castings, etc.

It is an object of the present invention to provide novel phosphorus-containing polymers and a process for their preparation.

It is a further object of the present invention to provide novel cross-linked phosphorus-containing polymers and a process for their preparation.

It is still a further object of the present invention to provide a novel vulcanizing or cross-linking agent for halogen-containing thermoplastic polymers.

Still other objects and advantages of the present invention will be apparent to those skilled in the art upon reference to the following detailed description and the examples.

In accordance with the present invention, it has been discovered that organophosphorus compounds such as polycyclic phosphinous esters, polycyclic phosphonous esters, polycyclic phosphite esters, and mixtures thereof may be polymerized by an Arbuzov type reaction to produce phosphorus-containing polymers of relatively high molecular weight. The resultant polymers are either cross-linked or capable of being readily cross-linked to thereby produce thermoset resins.

The Arbuzov reaction is well known and it is discussed in detail in numerous references such as the text, "Organophosphorus Compounds," by Gennady M. Kosolapoff, John Wiley and Sons, New York (1950), this discussion being incorporated herein by reference. Thus, the nature of the reaction conditions, organic halide initiators, and desirable catalysts are known and may be selected from the teachings of the prior art.

The polycyclic phosphorus esters for use in practicing the present invention are those of the type having at least two phosphorus ester groups which are capable of undergoing an Arbuzov reaction. For instance, polycyclic phosphinous esters, polycyclic phosphonous esters, and polycyclic phosphite esters having a minimum of two cyclic phosphorus esters groups per molecule, and with each of the two ester groups containing a phosphorus-oxygen-carbon bond which has a trivalent phosphorus atom and a carbon atom which will accept halogen in an Arbuzov reaction whereby each of the two ester groups is capable of undergoing an Arbuzov reaction, may be used in preparing the polymers of the invention. More than two cyclic ester groups as above defined may be present when this is desirable. Polycyclic phosphites in general and especially polycyclic phosphites of a pentaerythritol usually may be preferred. Also, dicyclic phosphorus esters often are more readily available and may be preferred over those esters containing more than two cyclic ester groups. For instance, dicyclic esters having the following general formulae may be used when the phosphorus-oxygen-carbon bond contains a trivalent phosphorus atom and the carbon atom is capable of accepting halogen in an Arbuzov reaction:

(I), (II), (III), (IV)

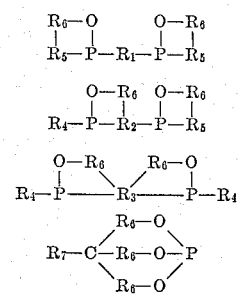

wherein:

$R_1$ represents a divalent organic, mono-oxyorganic, or di-oxyorganic radical such as, for example, an alkylene, cycloalkylene, arylene, mono- or di-oxyalkylene, mono- or di-oxycycloalkylene and mono- or di-oxyarylene radical;

$R_2$ represents a trivalent organic, mono-oxyorganic, or di-oxyorganic radical such as, for example, as may be derived by removing a substituent from one of the radicals mentioned above for $R_1$;

$R_3$ represents a tetravalent organic, mono-oxyorganic, or di-oxyorganic radical such as, for example, as may be derived by removing two substituents from one of the radicals mentioned above for $R_1$;

$R_4$ represents a monovalent organic or oxyorganic radical such as, for example, alkyl, cycloalkyl, aryl, oxyalkyl, oxycycloalkyl and oxyaryl;

$R_5$ represents a divalent organic or oxyorganic radical such as, for example, alkylene, cycloalkylene, arylene, mono-oxyalkylene, mono-oxycycloalkylene, and mono-oxyarylene; and $R_6$ represents a divalent organic radical such as, for example, alkylene, cycloalkylene and arylene.

$R_7$ represents a monovalent organic radical such as, for example, alkyl, cycloalkyl and aryl.

The preferred organic phosphorus compounds are the phosphites of pentaerythritol, dipentaerythritol and tripentaerythritol. Suitable compounds prepared from pentaerythritol have the following formula:

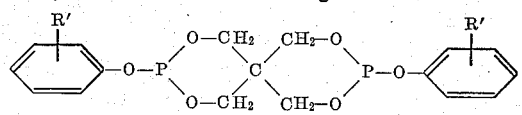

Where R' is selected from the group consisting of hydrogen, hydrocarbon and halogen. The hydrocarbon is preferably an alkyl, cycloalkyl, aryl or aralkyl group having one to ten carbon atoms. The halogen is preferably chlorine, bromine, or iodine. Typical examples of such compounds are as follows:

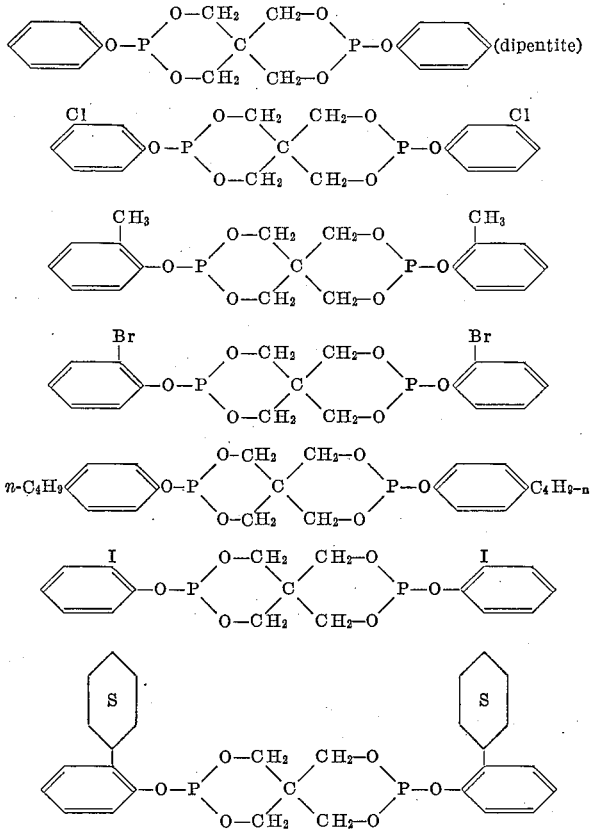

Compounds of this class are preferably prepared by the partial transesterification of a tertiary aromatic phosphite having the formula:

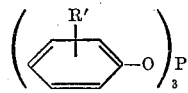

where R' is defined as before, with pentaerythritol, dipentaerythritol or tripentaerythritol. The reaction can be carried out at widely varying temperatures, although temperatures in the range from about thirty to one hundred degrees centigrade are generally preferred. Catalysts are not essential but are desirable at the lower reaction temperatures. Suitable catalysts are sodium phenate, trialkylamines such as triethylamine.

The derivatives of pentaerythritol are prepared using two moles of tertiary aromatic phosphite for each mole of pentaerythritol. Typical phosphites are tri-phenyl phosphite; tri-3-chlorophenyl phosphite; tri-2-methylphenyl phosphite; tri-2-bromophenyl phosphite; tri-4-tert. butylphenyl phosphite; and tri-2-cyclohexylphenyl phosphite.

Typical examples of compounds from dipentaerythritol are made using one mole of dipentaerythritol with four moles of phosphites such as: tri-phenyl phosphite; tri-p-chlorophenyl phosphite; tri-o-methylphenyl phosphite; and tri-p-n-octylphenyl phosphite.

Compounds from tripentaerythritol are made using one mole of tripentaerythritol with six moles of any of the triaromatic phosphites mentioned hereinbefore.

Preferably, when a phosphite ester is used, it is desirable that the ester be a monoaryl polycyclic phosphite as the polymer chain is not terminated during polymerization since a halogen-substituted benzene cannot be formed.

When dipentite is the polycyclic phosphorus ester to be polymerized in the presence initially of an organic halide, then the polymerization is thought to proceed via an Arbuzov reaction as follows wherein an organic chloride is used to exemplify an organic halide.

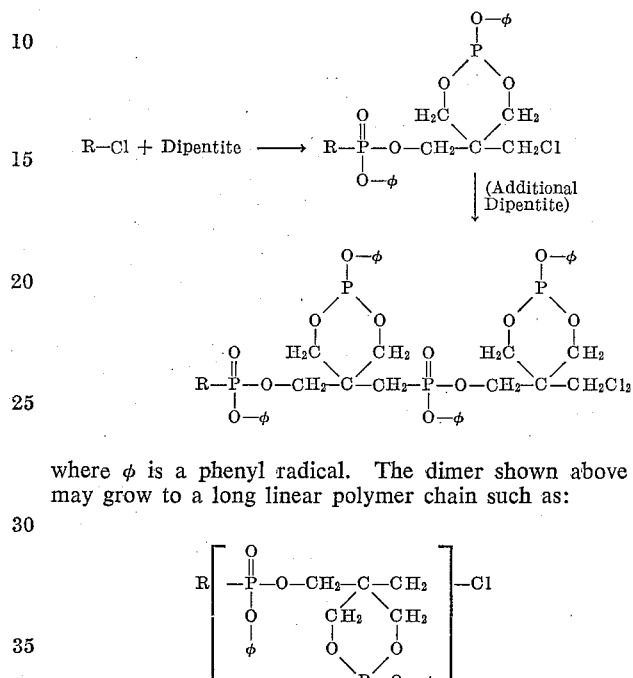

where $\phi$ is a phenyl radical. The dimer shown above may grow to a long linear polymer chain such as:

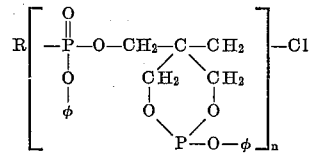

Where R is an organic radical such as isobutyl, $\phi$ is a phenyl radical and $n$ is a whole number of 2 or higher. However, since the resultant polymer chains contain initially some of the phosphorus ester groups which have not reacted and which are capable of undergoing Arbuzov reaction, the resultant polymer chains may be cross-linked through the cyclic phosphite groups by an Arbuzov reaction, as illustrated below:

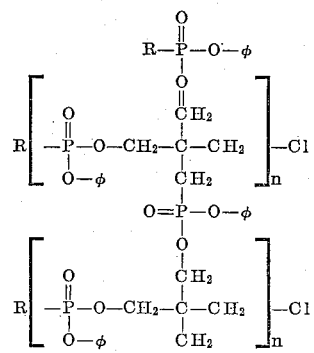

It is also possible to cross-link the polymers of the present invention by reacting by an Arbuzov reaction together with an organic polyhalide such as 1,4-dichlorobutane, or any of a large number of other organic polyhalides containing reactive halogen selected from the group consisting of chlorine, bromine, iodine and mixtures thereof. The organic polyhalide may be substantially any open chain polyhalogenated hydrocarbon or polyhalogenated cyclohydrocarbon containing reactive bromine, chlorine, or iodine, such as polyhalogenated hydrocarbons or cyclohydrocarbons containing 2–20 carbon atoms. When a polymer of dipentite is cross-linked with 1,4-dichlorobutane, then the cross-linking reaction is thought to proceed as follows, although other types of cross-linking also may be present such as discussed above.

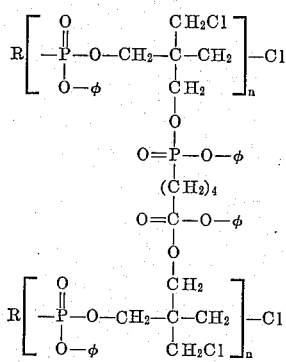

where φ is a phenyl radical, and R is an organic radical.

Organic halides for use as an initiator in an Arbuzov reaction are well known and may be any of a large number of suitable organic halides. For example, the organic halide may be an open chain halogenated hydrocarbon or a halogenated cyclohydrocarbon containing reactive chlorine, bromine and/or iodine. The amount of organic halide to be used as an initiator in practicing the present invention may vary over wide ranges, such as 0.1–10 parts by weight of the ester to be polymerized. However, much larger amounts such as 15, 25, or 50 parts by weight may be used.

The preferred organic halides for use in this invention are the halogen-substituted hydrocarbons having from one to twenty carbon atoms per molecule wherein the halogen is selected from the group consisting of chlorine, bromine and iodine. The hydrocarbon portion of the organic halide is preferably aliphatic, or arylaliphatic. Typical organic halides are: 1-chloropropane; 1,2-dibromopropane; 1-chlorobutane; 1,4-dichlorobutane; 1-iodobutane; 1,4-diiodobutane; 1-chloropentane; 1-bromo-3-methylpentane; 1-chlorooctane; 1-chlorodecane; 1-chloro-2-methylbutane; benzyl chloride; benzyl bromide; and benzyl iodide.

The polymerization temperature may vary widely and it is only essential that the polymerization mixture be at a temperature at which the Arbuzov reaction will take place. Suitable temperature ranges are well known to those skilled in the art, and may include, for example, a temperature of 75–300° C. Usually, a temperature of about 110° C.–200° C. is preferred. The polymerization is continued for a period of time sufficient to polymerize the ester. With continued subjection to Arbuzov reaction conditions, then cyclic ester groups which are present in the polymer and not reacted will react and further cross-linking will take place. Thus, the present invention is capable of providing a polymer having a desired degree of cross-linking. It is also possible to cross-link the polymer by admixing with the ester to be polymerized an organic polyhalide such as discussed herein in amounts such as 0.1–10% by weight or higher. Upon polymerization a cross-linking reaction occurs between the organic polyhalide and the unreacted phosphorus ester groups such as discussed above.

Catalysts useful in the Arbuzov polymerization of the polycyclic phosphorus esters mentioned herein are halogen-containing catalysts such as metallic halides of the Friedel-Crafts type and organometallic halides formed by reaction of an alkyl halide with a metal which is capable of forming organometallic compounds, e.g., magnesium, aluminum, zinc, lead, tin, antimony, cadmium, gallium, germanium, tellurium, etc. The Friedel-Crafts catalysts are preferred, such as the chlorides, bromides, or fluorides of aluminum, tin, zinc, magnesium, iron, titanium, bismuth, antimony, boron, etc.

Polymers of the present invention which contain unreacted phosphorus ester groups may be used in vulcanizing or cross-linking a wide variety of polymers containing reactive halogen selected from the group consisting of chlorine, bromide, iodine and mixtures thereof attached directly to a carbon atom. Examples of such polymers include polyvinyl chloride, polyvinylidene chloride, chlorinated polymers of ethylenically unsaturated hydrocarbons and especially polymers of unsaturated hydrocarbons containing 2–8 carbon atoms such as chlorinated polyethylene, copolymers of vinyl chloride and vinylidene chloride, and copolymers of monomeric material such as vinyl chloride, vinylidene chloride and mixtures thereof and a different ethylenically unsaturated monomeric material copolymerizable therewith. Examples of copolymers of vinyl chloride include copolymers of vinyl chloride with, for example, 1 to 30% by weight of a different ethylenically unsaturated copolymerizable monomeric material such as vinyl acetate, vinylidene chloride, diethyl fumarate, diethyl maleate and other alkyl fumarates and maleates, vinyl propionate, methyl acrylate, ethyl acrylate, butyl acrylate and other alkyl acrylates, methyl methacrylate, ethyl methacrylate, butyl methacrylate and other methacrylates, methyl alpha chloroacrylate, styrene trichloroethylene, etc. Typical copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), and vinyl chloride-trichloroethylene (95:5 weight ratio).

Bromine or iodine may be substituted for chlorine in monomers used in preparing the foregoing polymers or substituted for another substituent attached to a carbon atom in the monomer or prepared polymer. Also chlorine, bromine and/or iodine may be substituted for another substituent attached to a carbon atom or added to ethylenically unsaturated naturally occurring or synthetic polymers, or substituted for another substituent attached to a carbon atom in saturated copolymers to provide halogen-containing polymers for vulcanizing in accordance with the present invention. It has been found that the polymers of the invention are ineffective for vulcanizing fluorine-containing polymers of the foregoing types which do not contain chlorine, bromine or iodine. Thus, the term "halogen-containing" as used herein to refer to such polymers is understood to be limited to polymers containing chlorine, bromine, iodine and mixtures thereof.

Generally, the vulcanization of the above polymers proceeds even more readily with bromine or iodine containing polymers than with polymers containing only chlorine. Thus in some instances in the preparation of the polymers to be vulcanized it may be desirable to substitute a bromine or iodine containing monomer for a portion of a chlorine-containing monomer normally employed. It has also been found that primary halogen is more reactive than secondary halogen and thus the vulcanization usually proceeds even more readily when primary halogen attached directly to a carbon atom is present in the polymer. Therefore, in instances where it is desirable to effect a very rapid vulcanization an allyl halide such as allyl chloride or other polymerizable monomer providing primary halogen upon polymerization may be substituted at least in part for a monomer normally employed.

The foregoing detailed discussion and the following specific examples are for purposes of illustrtaion only and are not intended as being limiting to the spirit or scope of the appended claims.

*Example 1*

Dipentite in the amount of 100 parts by weight is mixed with 10 parts by weight of 1,4-dichlorobutane. One part by weight of anhydrous aluminum chloride catalyst is added thereto, and the resultant mixture is heated at 110° C. for a few hours until the contents are a soft rubbery gel with complete loss of fluidity. The thermoset mass is a clear, light amber color and a sample heated in a strongly oxidizing flame ignites but goes out and is self-extinguishing when removed from the flame.

Example 2

Dipentite is heated at 110° C. in the presence initially of small catalytic amounts of 1-chlorobutane as an organic monohalide initiator and anhydrous aluminum chloride as a catalyst. With continued heating, the reaction mixture is polymerized with complete loss of fluidity and a thermoset polymer is produced. Thus, the dipentite is polymerized by an Arbuzov reaction and is thermoset thereby indicating that extensive cross-linking of the resultant linear polymer chains has taken place.

Using the method described in Example 1, additional polymers are prepared in accordance with this invention using the starting materials indicated in the following examples.

and

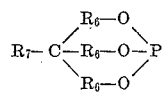

in the presence of an organic halide initiator for the reaction, containing from 1 to 20 carbon atoms, at a temperature of about 75 to 300 degrees centigrade thereby causing the polymerization of the ester, where, in said ester, $R_1$ is a divalent organic radical selected from the group consisting of alkylene, cycloalkylene, arylene and mono- and di-oxyalkylene, oxycycloalkylene and oxy-

| Example | Phosphorus Compound | Organic Halide |
|---|---|---|
| 3 | (phenyl)–O–P(OCH₂)₂C(CH₂O)₂P–O–(phenyl) | Benzyl chloride. |
| 4 | Cl-(phenyl)–O–P(OCH₂)₂C(CH₂O)₂P–O–(phenyl)-Cl | 1-Chlorobutane. |
| 5 | CH₃-(phenyl)–O–P(OCH₂)₂C(CH₂O)₂P–O–(phenyl)-CH₃ | Do. |
| 6 | Br-(phenyl)–O–P(OCH₂)₂C(CH₂O)₂P–O–(phenyl)-Br | Do. |
| 7 | n-C₄H₉-(phenyl)–O–P(OCH₂)₂C(CH₂O)₂P–O–(phenyl)-C₄H₉-n | Benzyl chloride. |
| 8 | I-(phenyl)–O–P(OCH₂)₂C(CH₂O)₂P–O–(phenyl)-I | 1-Chlorobutane. |
| 9 | (S-thienyl)-(phenyl)–O–P(OCH₂)₂C(CH₂O)₂P–O–(phenyl)-(S-thienyl) | Do. |

The resulting polymers have very good fire resistance.

The polymers prepared in accordance with this invention are useful in the production of structural panels, coatings and industrial applications such as moldings and castings (gears and other machine parts, machine housings and the like). The polymers are particularly useful where their excellent fire retardant and translucent properties can be used to advantage.

What is claimed is:

1. A process for preparing a phosphorus containing polymer comprising reacting a polycyclic phosphorus ester selected from the group consisting of

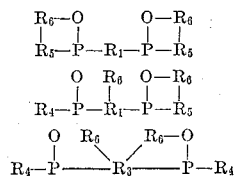

arylene; $R_2$ is a trivalent organic radical derived by removing a substituent from the divalent organic radicals of $R_1$; $R_3$ is a tetravalent organic radical derived by removing two substituents from the divalent organic radical of $R_1$; $R_4$ is a monovalent organic radical selected from the group consisting of alkyl, cycloalkyl, aryl, oxyalkyl, oxycycloalkyl and oxyaryl; $R_5$ is a divalent organic radical selected from the group consisting of alkylene, cycloalkylene, arylene, mono-oxyalkylene, mono-oxycycloalkylene and mono-oxyarylene; $R_6$ is a divalent organic radical selected from the group consisting of alkylene, cycloalkylene and arylene; and $R_7$ is a mono-valent organic radical selected from the group consisting of alkyl, cycloalkyl and aryl, said reaction being effected in the presence of a catalyst for the reaction selected from the group consisting of metallic halides and organometallic halides.

2. The process of claim 1 wherein the phosphorus ester is a polycyclic phosphite of a pentaerythritol.

3. The process of claim 1 wherein the phosphorus ester is the partial transesterification product of a tertiary aromatic phosphite having the formula:

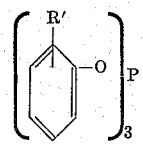

wherein R' is selected from the group consisting of alkyl, cycloalkyl, aryl and aralkyl of 1 to 10 carbon atoms, hydrogen and halogen and a pentaerythritol selected from the group consisting of pentaerythritol, dipentaerythritol and tripentaerythritol.

4. The process of claim 1 wherein the phosphorus ester is a cyclic phosphite of the formula

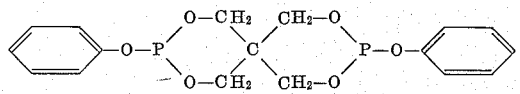

5. A process for preparing a cross-linked phosphorus containing polymer comprising reacting a polycyclic phosphorus ester selected from the group consisting of:

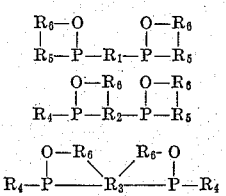

and

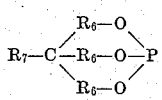

in the presence of an organic halide initiator for the reaction containing from 1 to 20 carbon atoms at a temperature of about 75 to 300 degrees centigrade thereby causing the polymerization of the ester, where, in said ester, R is a divalent organic radical selected from the group consisting of alkylene, cycloalkalkylene, arylene, and mono- and di-oxyalkylene, oxycycloalkylene and oxyarylene; $R_2$ is a trivalent organic radical derived by removing a substituent from the divalent organic radicals $R_1$; $R_3$ is a tetravalent organic radical derived by removing two substituents from the divalent organic radicals of $R_1$; $R_4$ is a monovalent organic radical selected from the group consisting of alkyl, cycloalkyl, aryl, oxyalkyl, oxycycloalkyl and oxyaryl; $R_5$ is a divalent organic radical selected from the group consisting of alkylene, cycloalkylene, arylene, mono-oxyalkylene, mono-oxycycloalkylene and mono-oxyarylene; $R_6$ is a divalent organic radical selected from the group consisting of alkylene, cycloalkylene and arylene; and $R_7$ is a mono-valent organic radical selected from the group consisting of alkyl, cycloalkyl and aryl, said reaction being effected in the presence of a catalyst for the reaction selected from the group consisting of metallic halides and organometallic halides, the resultant polymer chains containing initially some residual cyclic phosphorus ester groups, and continuing the polymerization reaction after the formation of said polymer chains whereby adjacent polymer chains containing the cyclic phosphorus ester groups are cross-linked therethrough.

6. The process of claim 5 wherein the phosphorus ester is a polycyclic phosphite of a pentaerythritol.

7. The process of claim 5 wherein the phosphorus ester is the partial transesterification product of a tertiary aromatic phosphite having the formula:

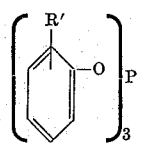

wherein R' is selected from the group consisting of alkyl, cycloalkyl, aryl and aralkyl of 1 to 10 carbon atoms, hydrogen and halogen and a pentaerythritol selected from the group consisting of pentaerythritol, dipentaerythritol and tripentaerythritol.

8. The process of claim 5 wherein the phosphorus ester is a cyclic phosphite of the formula

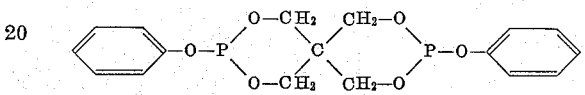

9. A process for preparing a cross-linked phosphorus containing polymer comprising reacting a polycyclic phosphorus ester selected from the group consisting of

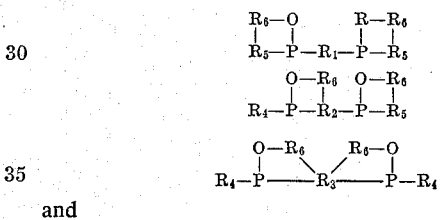

and

in the presence of an organic halide initiator for the reaction containing from 1 to 20 carbon atoms at a temperature of about 75 to 300 degrees centigrade thereby causing the polymerization of the ester where, in said ester, $R_1$ is a divalent organic radical selected from the group consisting of alkylene, cycloalkalkylene, arylene and mono- and di- oxyalkylene, oxycycloalkylene and oxyarylene; $R_2$ is a trivalent organic radical derived by removing a substituent from the divalent organic radicals of $R_1$; $R_3$ is a tetravalent organic radical derived by removing two substituents from the divalent organic radicals of $R_1$; $R_4$ is a monovalent organic radical selected from the group consisting of alkyl, cycloalkyl, aryl, oxyalkyl, oxycycloalkyl and oxyaryl; $R_5$ is a divalent organic radical selected from the group consisting of alkylene, cycloalkylene, arylene, mono-oxyarylene; $R_6$ is a divalent organic radical selected from the group consisting of alkylene, cycloalkylene and arylene; and $R_7$ is a monovalent organic radical selected from the group consisting of alkyl, cycloalkyl and aryl, said reaction being effected in the presence of a catalyst for the reaction selected from the group consisting of metallic halides and organometallic halides, the resultant polymer chains containing initially some residual cyclic phosphorus ester groups, and cross-linking said polymer chains by further reacting at said temperature with an organic polyhalide of 2 to 20 carbon atoms containing a reactive halogen selected from the group consisting of chlorine, bromine, iodine and mixtures thereof attached directly to a carbon atom.

10. The process of claim 9 wherein the phosphorus ester is a polycyclic phosphite of a pentaerythritol.

11. The process of claim 9 wherein the phosphorus ester is the partial transesterification product of a tertiary aromatic phosphite having the formula

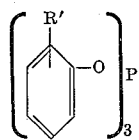

wherein R' is selected from the group consisting of alkyl, cycloalkyl, aryl and aralkyl of 1 to 10 carbon atoms, hydrogen and halogen, and a pentaerythritol selected from the group consisting of pentaerythritol, dipentaerythritol and tripentaerythritol.

12. The process of claim 9 wherein the phosphorus ester is a cyclic phosphite of the formula

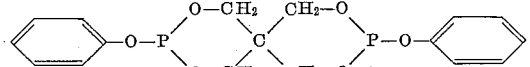

13. A polymer prepared by reacting a polycyclic phosphorus ester selected from the group consisting of

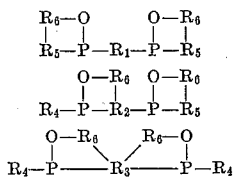

and

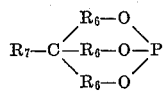

in the presence of an organic halide initiator for the reaction containing from 1 to 20 carbon atoms at a temperature of about 75 to 300 degrees centigrade thereby causing the polymerization of the ester, where, in said ester, $R_1$ is a divalent organic radical selected from the group consisting of alkylene, cycloalkalylene, arylene, and mono- and di- oxyalkylene, oxycycloalkylene and oxyarylene; $R_2$ is a trivalent organic radical derived by removing a substituent from the divalent organic radicals of $R_1$; $R_3$ is a tetravalent organic radical derived by removing two substituents from the divalent organic radicals of $R_1$; $R_4$ is a monovalent organic radical selected from the group consisting of alkyl, cycloalkyl, aryl, oxyalkyl, oxycycloalkyl and oxyaryl; $R_5$ is a divalent organic radical selected from the group consisting of alkylene, cycloalkylene, arylene, mono- oxyalkylene, mono-oxycycloalkylene and mono- oxyarylene; $R_6$ is a divalent organic radical selected from the group consisting of alkylene, cycloalkylene and arylene; and $R_7$ is a monovalent organic radical selected from the group consisting of alkyl, cycloalkyl and aryl, said reaction being effected in the presence of a catalyst for the reaction selected from the group consisting of metallic halides and organometallic halides.

14. The polymer of claim 13 wherein the polycyclic phosphorus ester is a polycyclic phosphite of a pentaerythritol.

15. The polymer of claim 13 wherein the phosphorus ester is the partial transesterification product of a tertiary aromatic phosphite having the formula

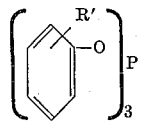

wherein R' is selected from the group consisting of alkyl, cycloalkyl, aryl and aralkyl of 1 to 10 carbon atoms, hydrogen and halogen, and a pentaerythritol selected from the group consisting of pentaerythritol, dipentaerythritol and tripentaerythritol.

16. The polymer of claim 13 wherein the phosphorus ester is a cyclic phosphite of the formula

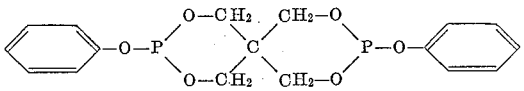

17. A cross-linked polymer prepared by reacting a polycyclic phosphorus ester selected from the group consisting of

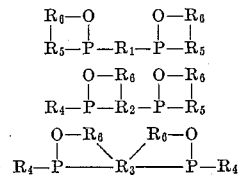

and

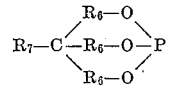

in the presence of an organic halide initiator for the reaction containing from 1 to 20 carbon atoms at a temperature of about 75 to 300 degrees centigrade thereby causing the polymerization of the ester, where, in said ester, $R_1$ is a divalent organic radical selected from the group consisting of alkylene, cycloalkalylene, arylene and mono- and di- oxyalkylene, oxycycloalkylene and oxyarylene; $R_2$ is a trivalent organic radical derived by removing a substituent from the divalent organic radicals of $R_1$; $R_3$ is a tetravalent organic radical derived by removing two substituents from the divalent organic radicals of $R_1$; $R_4$ is a monovalent organic radical selected from the group consisting alkyl, cycloalkyl, aryl, oxyalkyl, oxycycloalkyl and oxyaryl; $R_5$ is a divalent organic radical selected from the group consisting of alkylene, cycloalkylene, arylene, mono-oxyalkylene, mono-oxycycloalkylene and mono-oxyarylene; $R_6$ is a divalent organic radical selected from the group consisting of alkylene, cycloalkylene and arylene; and $R_7$ is a monovalent organic radical selected from the group consisting of alkyl, cycloalkyl and aryl, said reaction being effected in the presence of a catalyst for the selected from the group consisting of metallic halides and organometallic halides, the resultant polymer chains containing initially some residual cyclic phosphorus ester groups and continuing the polymerization reaction after the formation of said polymer chains whereby adjacent polymer chains containing the cyclic phosphorus ester groups are cross-linked therethrough.

18. The polymer of claim 17 wherein the polycyclic phosphorus ester is a polycyclic phosphite of a pentaerythritol.

19. The polymer of claim 17 wherein the phosphorus ester is the partial transesterification product of a tertiary aromatic phosphite having the formula

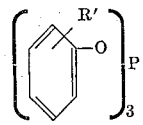

wherein R' is selected from the group consisting of alkyl, cycloalkyl, aryl and aralkyl of 1 to 10 carbon atoms, hydrogen and halogen, and a pentaerythritol selected from the group consisting of pentaerythritol, dipentaerythritol and tripentaerythritol.

20. The polymer of claim 17 wherein the phosphorus ester is a cyclic phosphite of the formula

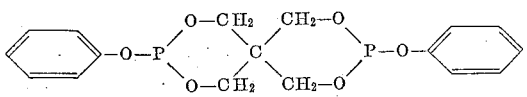

21. A cross-linked polymer prepared by reacting a polycyclic phosphorus ester selected from the group consisting of

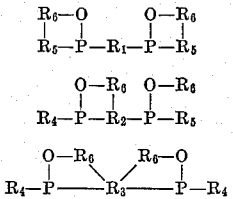

and

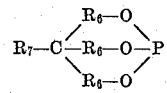

in the presence of an organic halide initiator for the reactor containing from 1 to 20 carbon atoms at a temperature of about 75 to 300 degrees centigrade thereby causing the polymerization of the ester where, in said ester, $R_1$ is a divalent organic radical selected from the group consisting of alkylene, cycloalkalkylene, arylene, and mono- and di-oxyalkylene, oxycycloalkylene and oxyarylene; $R_2$ is a trivalent organic radical derived by removing a substituent from the divalent organic radicals of $R_1$; $R_3$ is a tetravalent organic radical derived by removing two substituents from the divalent organic radicals of $R_1$; $R_4$ is a monovalent organic radical selected from the group consisting of alkyl, cycloalkyl, aryl, oxyalkyl, oxycycloalkyl and oxyaryl; $R_5$ is a divalent organic radical selected from the group consisting of alkylene, cycloalkylene, arylene, mono-oxyalkylene, mono-oxycycloalkylene and mono-oxyarylene; $R_6$ is a divalent organic radical selected from the group consisting of alkylene, cycloalkylene and arylene; and $R_7$ is a monovalent organic radical selected from the group consisting of alkyl, cycloalkyl and aryl, said reaction being effected in the presence of a catalyst for the reaction selected from the group consisting of metallic halides and organo-metallic halides, the resultant polymer chains containing initially some residual cyclic phosphorus ester groups, and cross-linking said polymer chains by further reacting at said temperature with an organic polyhalide of 2 to 20 carbon atoms containing a reactive halogen selected from the group consisting of chlorine, bromine, iodine and mixtures thereof attached directly to a carbon atom.

22. The polymer of claim 21 wherein the phosphorus ester is a polycyclic phosphite of a pentaerythritol.

23. The polymer of claim 21 wherein the phosphorus ester is the partial transesterification product of a tertiary aromatic phosphite having the formula

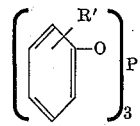

wherein R' is selected from the group consisting of alkyl, cycloalkyl, aryl and aralkyl of 1 to 10 carbon atoms, hydrogen and halogen, and a pentaerythritol.

24. The polymer of claim 23 wherein the phosphorus ester is a cyclic phosphite of the formula

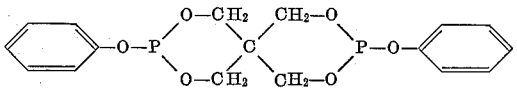

References Cited by the Examiner

UNITED STATES PATENTS

| | | | |
|---|---|---|---|
| 2,847,443 | 8/1958 | Hechenbleikner et al. | 260—2 |
| 2,893,961 | 7/1959 | McManimie | 260—2 |
| 3,039,993 | 6/1962 | Friedman | 260—461 |

SAMUEL H. BLECH, *Primary Examiner.*

HAROLD N. BURSTEIN, MURRAY TILLMAN,
               *Examiners.*

J. T. BROWN, *Assistant Examiner.*

UNITED STATES PATENT OFFICE
CERTIFICATE OF CORRECTION

Patent No. 3,257,355                                   June 21, 1966

Claude Thomas Bean, Jr.

It is hereby certified that error appears in the above numbered patent requiring correction and that the said Letters Patent should read as corrected below.

Column 2, line 1, for "esters" read -- ester --; column 6, line 63, for "illustrtaion" read -- illustration --; column 7, lines 71 to 73, the structure should appear as shown below instead of as in the patent:

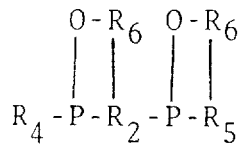

column 10, lines 27 to 30, the structure should appear as shown below instead of as in the patent:

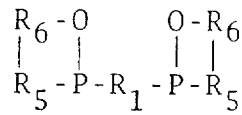

column 12, line 35, for "consisting alkyl" read -- consisting of alkyl --; line 44, for "for the selected" read -- for the reaction selected --; column 14, line 22, for the claim reference numeral "23" read -- 21 --.

Signed and sealed this 24th day of June 1969.

(SEAL)
Attest:

EDWARD M. FLETCHER, JR.                  WILLIAM E. SCHUYLER, JR.
Attesting Officer                             Commissioner of Patents